United States Patent [19]

Langley et al.

[11] 4,116,160

[45] Sep. 26, 1978

[54] FLUIDIZED BED, GAS COATING APPARATUS

[75] Inventors: John Randolph Langley, Trenton, N.J.; Michael H. Spritzer, San Diego, Calif.

[73] Assignee: General Atomic Company, San Diego, Calif.

[21] Appl. No.: 735,186

[22] Filed: Oct. 26, 1976

[51] Int. Cl.² .............................................. C23C 13/00
[52] U.S. Cl. ................................ 118/48; 118/DIG. 5; 176/91 SP
[58] Field of Search .................................. 118/48–49.5, 118/DIG. 5, 308, 312; 427/21, 50, 52, 212, 213, 248–252, 124; 176/67, 68, 91 R, 91 SP; 23/264; 34/57 A, 57 E

[56] References Cited

U.S. PATENT DOCUMENTS

| 3,091,594 | 5/1963 | Borey .................................. 34/57 A |
| 3,215,508 | 11/1965 | Piester ................................ 23/284 X |
| 3,251,337 | 5/1966 | Latta et al. ............................ 118/48 |
| 3,329,506 | 7/1967 | Smith, Jr. ............................ 34/57 A |
| 3,370,361 | 2/1968 | Guerriere ............................ 34/57 A |
| 3,398,718 | 8/1968 | Pilloton .................................. 118/48 |
| 3,822,140 | 7/1974 | Gyarmati et al. .............. 118/DIG. 5 |
| 3,839,077 | 10/1974 | Robinson ............................ 118/48 X |

FOREIGN PATENT DOCUMENTS 2,102,438  8/1972  Fed. Rep. of Germany ........... 427/213

Primary Examiner—Morris Kaplan
Attorney, Agent, or Firm—Fitch, Even, Tabin & Luedeka

[57] ABSTRACT

Apparatus for coating particles with a substance contained in a reactant gas, the particles being suspended in a fluidized bed within a coating chamber, an elongated nozzle extending upwardly from the coating chamber base with an outlet for reactant gas being substantially above the base to direct the reactant gas into a dilute phase region of the particles. With the base of the chamber being an inverted conical member, coated particles are preferably removed from the chamber by means of a movable plug forming the apex of the conical member, the elongated nozzle preferably being mounted upon the unloading plug.

9 Claims, 7 Drawing Figures

FLUIDIZED BED, GAS COATING APPARATUS

BACKGROUND OF THE INVENTION

The present invention relates to an apparatus for the gas coating of particles suspended in a fluidized bed. More particularly, the invention relates to such an apparatus wherein the particles, for example, nuclear fuel particles, are coated under high temperature conditions.

It is well known in the prior art to employ coatings of pyrolytic carbon or metallic carbides, for example, to provide protection for nuclear fuel particles of a type used in nuclear reactors. The fuel particles are small, for example, on the order of 500 microns, and may be formed from a suitable fissile and/or fertile material, such as uranium, plutonium, thorium or suitable compounds of such materials.

Within a nuclear reactor, the nuclear fuel particles are exposed to conditions of high temperature and severe irradiation over prolonged periods of operation. In order to assure continued effectiveness within such an environment over long periods of time, it has become common to coat the fuel particles with an impermeable material in order to retain gaseous and metallic fission products within the confines of the individual particles.

Pyrolytic carbon and metallic carbide are specific examples of materials composing such coatings for nuclear fuel particles. The coatings may be applied within a high temperature coating chamber through the introduction of a reactant gas having as a substantial component, or consisting entirely of, a suitable hydrocarbon such as acetylene, propylene, propane or methane.

Examples of fuel particles provided with such coatings are disclosed and set forth for example in U.S. Pat. No. 3,325,363 issued June 13, 1967 to Goeddel et al.; U.S. Pat. No. 3,298,921 issued Jan. 17, 1968 to Bokros et al.; U.S. Pat. No. 3,361,638 issued Jan. 2, 1968 to Bokros et al.; and U.S. Pat. No. 3,649,452 issued Mar. 14, 1972 to Chin et al.

A preferred method for coating nuclear fuel particles with a suitable material such as pyrolytic carbon or metallic carbide comprises the deposition of the desired substance through the high temperature decomposition of the gaseous hydrocarbons of the type noted above. When the particles being coated are relatively small, the coating operation may be efficiently carried out with the particles suspended in the form of a fluidized bed within a high temperature coating chamber. Levitation or suspension of the particles within the fluidized bed is commonly achieved through the controlled introduction of a hydrocarbon gas, an inert carrier gas or a combination thereof, beneath the particle bed. Most commonly an inert carrier gas is employed for this purpose and may comprise argon, helium, nitrogen or hydrogen for example.

Within a preferred configuration for such a coating chamber, the coating chamber base is formed from a plate preferably in the form of an inverted conical member which is porous or otherwise provided with means for introducing the carrier or levitating gas beneath the particle bed.

Within such a coating chamber, the small nuclear fuel particles tend to be suspended within the fluid bed under generally isothermal conditions. The reactant gas being introduced into the high temperatures of the coating chamber is decomposed and results in the deposition of the coating material upon the particles. The various conditions for carrying out such a coating operation are well known in the prior art and include temperature ranges within the coating chamber as well as the rates and pressures under which both the reactant and levitating gases are introduced into the chamber and the duration of the coating operation.

The operation of such high temperature gas coating operations for fluidized beds of particles, carried out in accordance with the prior art, has encountered numerous problems. For example, because of the decomposition of the reactant gas within the high temperature environment, there tends to be substantial deposition or buildup of carbonaceous material upon internal surfaces of the chamber. Such carbon buildup is a particular problem where it tends to interfere with the proper introduction of levitating gases for maintaining the fluidized bed of particles or where it interferes with the introduction of additional reactant gas for carrying out the coating operation. For example, where a porous plate is employed to form the base of the coating chamber and the levitating gases are introduced therethrough, the deposition of carbonaceous material upon the upper surfaces of the plate tends to interfere with the flow of the levitating gas and thus disrupts uniform fluidization of the particle bed. In addition, such carbon buildup has been found to interfere with the unloading of batches of coated particles from the chamber.

Another problem concerns the batch size of particles which may be coated during a single operation within the chamber and the related requirement for assuring that the coated particles have a generally spherical configuration. This requirement is particularly important since facets or flat areas may tend to be developed upon the particle surfaces during coating. Faceting is undesirable since it limits structural integrity of the particle coating especially under severe irradiation conditions through the development of local stresses and anisotropic zones.

Another general problem area relates to efficiency of the coating operation. Three particularly important factors affecting efficiency include the batch size of particles to be coated at one time, the problem of rapidly unloading coated particles from the coating chamber to prepare the chamber for receiving a subsequent particle batch and the amount of maintenance necessary between coating runs. Such maintenance primarily involves the removal of coating material from internal components of the coating apparatus.

Two common techniques for unloading the coating chamber include the vacuum removal of the coated particles through a vacuum probe and the forming of an unloading port in a lower portion of the chamber to permit gravity flow of the coated particles. Vacuum removal of the particles is generally undesirable for various reasons. Initially, the vacuum system must withstand the coating chamber temperatures through the use of special materials and/or cooling of the vacuum equipment or particles. Additionally, operation of the vacuum system is awkward since a wand or probe must be lowered through the substantial depth of the coating chamber. Thus, it is difficult to assure complete unloading of coated particles from the chamber.

At the same time, gravity unloading of the particles has been a problem in the past because of the difficulty of achieving rapid flow of the particles through a suitable unloading port.

Finally, the construction of coating chambers has been relatively complex in the past because of the need for supplying the levitating gas to the chamber and supplying the reactant gas to the coating chamber without decomposition as well as providing a means for rapidly and efficiently unloading coated particles from the chamber.

Accordingly, there has been found to remain a substantial need for an improved method and apparatus for the gas coating of particles suspended in a fluidized bed.

SUMMARY OF THE INVENTION

It is therefore an object of the present invention to provide an improved apparatus for the gas coating of particles suspended in a fluidized bed while overcoming one or more problems of the type referred to above.

It is a more specific object of the invention to provide such apparatus including a generally cylindrical coating chamber having a base in the form of an inverted conical member wherein a nozzle for introducing reactant gas into the coating chamber has an outlet spaced above the apex of the conical member to improve the coating characteristics of the particles and to minimize buildup resulting from decomposition of the reactant gas.

It is another more specific object of the invention to provide such gas coating apparatus including a coating chamber having an inverted conical member forming its base wherein a bottom unloading plug is arranged at the apex of the conical member and forms an annular opening to permit unloading of coated particles from the chamber.

It is an even more specific object of the invention to employ such a bottom unloading plug for permitting the unloading of hot coated particles from the coating chamber following a coating process requiring a high temperature environment.

Another more specific object of the invention is the incorporation of an upwardly extending nozzle being mounted upon the bottom unloading plug. With this arrangement, means may be employed in connection with the bottom unloading plug for supplying reactant gas to the nozzle means, an annular chamber being formed below the bottom unloading plug for receiving the coated particles during unloading.

Yet another specific object of the invention is to provide a reactant gas nozzle of the type referred to above within a coating chamber wherein a bed of particles is fluidized into gradient phases including a relatively high density phase of particles formed close to the coating chamber base and a relatively low density phase of particles being formed into a region substantially above the coating chamber base, the nozzle being arranged within the chamber with an outlet positioned for directing reactant gases into said relatively low density phase region in order to promote coating of the particles therein.

A closely related object of the invention is to provide an apparatus wherein gas coating including the forming of such a gradient fluidized bed of particles followed by the introducing of a flow of reactant gas into said relatively low density phase region.

Additional objects and advantages of the invention are made apparent in the following description having reference to the accompanying drawings.

DESCRIPTION OF THE PREFERRED EMBODIMENTS

Figure 1:
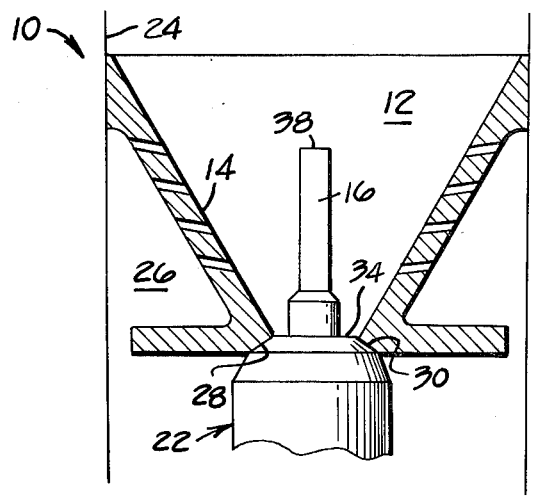
FIG. 1 is an axially sectioned view of a gas coating chamber of the type contemplated by the present invention.
Figure 2:
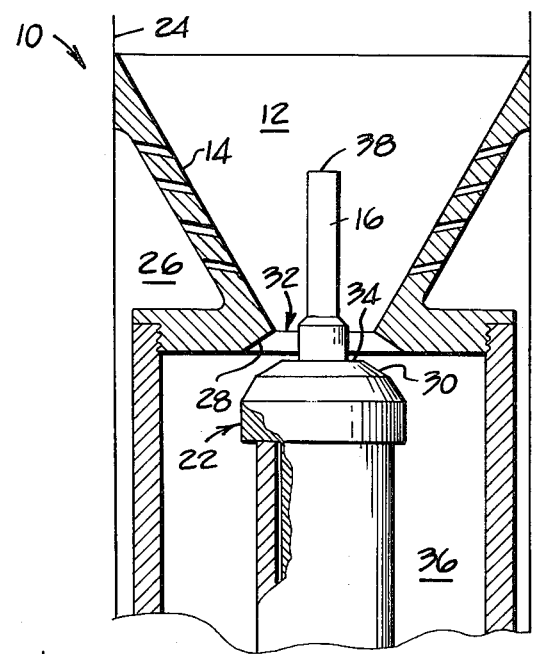
FIG. 2 is a view similar to FIG. 1 with a portion of the coating chamber being repositioned for the unloading of coated particles.

Generally, the present invention relates to an apparatus for the gas coating of particles suspended in a fluidized bed. Referring to FIGS. 1 and 2, coating apparatus generally indicated at 10 forms a coating chamber 12 having a base 14. A preferred nozzle configuration is indicated at 16' in FIG. 3 for introducing reactant gas into the coating chamber. In this regard, the base 14' of the coating chamber is preferably formed as an inverted conical member including means for introducing levitating gas into the coating chamber to form a fluidized bed of particles therein. The nozzle 16' is configured to extend upwardly from the apex of the conical member in order to minimize carbon deposition as illustrated in FIG. 5 compared to the prior art representation of FIG. 4.

Figure 3:
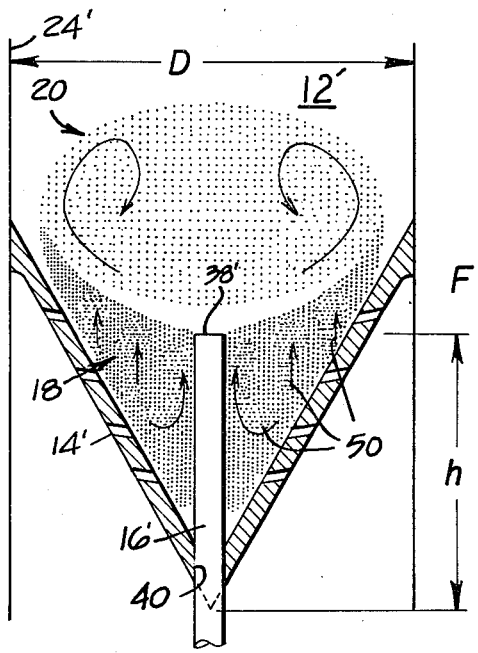
FIG. 3 is a representation of a coating chamber in accordance with the present invention to illustrate a preferred nozzle arrangement for introducing reactant coating gas into a dilute particle phase region of a fluidized particle bed in the coating chamber.
Figure 6:
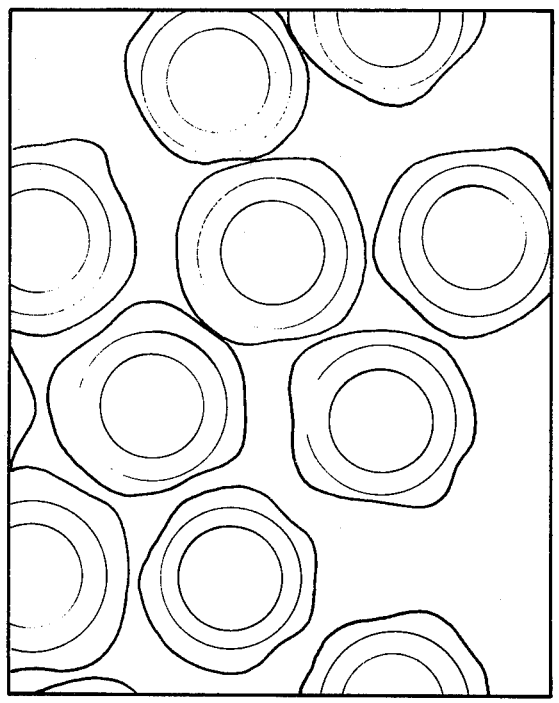
FIGS. 6 and 7 represent enlargements of coated particle configurations resulting from the use of the prior art nozzle arrangement illustrated in FIG. 4 and the nozzle arrangement of the present invention as illustrated for example in FIG. 5.
Figure 7:
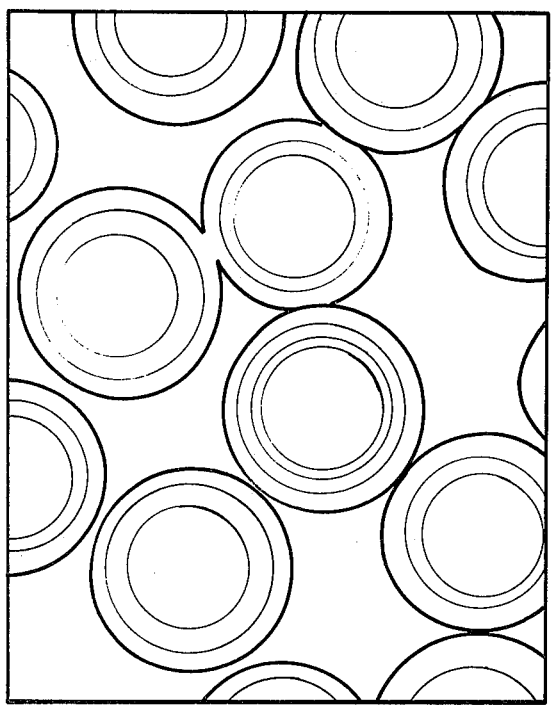

At this point, it is noted that the present invention is not limited to a coating chamber having a cylindrical configuration or a conical shaped base. For example, the upwardly extending nozzle 16' of FIG. 3 is contemplated for use within any coating chamber wherein a fluidized bed of particles is formed in gradient phases including a relatively high density phase 18 of particles formed adjacent the coating chamber base 14' with a relatively low density phase 20 of particles being formed in a region substantially spaced above the coating chamber base. Such a condition could of course be produced in other configurations of coating chambers without the need for a conically shaped base. Within that configuration, the nozzle is arranged with its outlet directing reactant gas into the relatively low density region 20 in order to improve the coating characteristics for the particles as illustrated by the comparison of FIGS. 6 and 7.

Referring again to FIGS. 1 and 2, a bottom unloading plug 22 is provided for facilitating the unloading of coated particles from the chamber 12 in a manner described in greater detail below. It is particularly important to note that the bottom unloading plug facilitates the unloading of coated particles from the high temperature coating chamber while the coated particles are still at a very high temperature.

It may also be seen from FIGS. 1 and 2 that the nozzle for introducing reactant gas into the coating chamber, as discussed above, is preferably mounted upon the bottom unloading plug 22 in order to simplify construction of the coating apparatus and facilitate its operation.

The features of the present invention as discussed above are particularly contemplated in the gas coating of nuclear fuel particles within a high temperature coating chamber through the decomposition of a reactant gas including a suitable hydrocarbon. However, it will be apparent from the following description that the present invention may also be employed for other gas coating operations where particles to be coated are suspended in a fluidized bed.

To describe the embodiments of the present invention illustrated in the drawings in greater detail, reference is initially made to the coating apparatus of FIGS. 1 and 2. The coating chamber is formed for example within a reactor vessel including vertical walls 24, the reactor vessel being suitable for arrangement within a high temperature furnace (not shown).

The base 14 for the coating chamber is an inverted conical member formed from a porous material allowing the introduction of levitating gas from an annular region 26 upwardly into the coating chamber 12. In accordance with the present invention, the conical member may also be formed from perforated material for example which would be similarly capable of introducing levitating gas into the coating chamber. Therefor, the term "porous," as used within the present application, includes perforated materials and the like. The conical member may have an included angle within the general range of 30° to 140°. More preferably, the included angle of the conical member 14 is selected within the range of approximately 45° to approximately 90°. In all of the drawings, the conical member is illustrated with a 60° included angle.

In order to accommodate the bottom unloading plug 22, the conical member 14 is formed with a cylindrical opening 28 at its apex, the opening 28 tapering downwardly and outwardly in order to mate with a tapered annular surface 30 on the bottom unloading plug 22. The bottom unloading plug 22 is vertically movable in order to form an annular opening 32 between the tapered surfaces 28 and 30 as illustrated in FIG. 2. Thus, after completion of a coating operation, the bottom unloading plug 22 may be lowered into the position illustrated in FIG. 2 to form the annular opening 32 through which the coated particles may exit the coating chamber 12. Otherwise, an upper surface 34 of the bottom unloading plug 22 cooperates with the conical member 14 to provide a continuous base for the coating chamber 12.

As indicated above, the reactant gas nozzle 16 is preferably constructed as a portion of the bottom unloading plug 22. This combination offers a number of advantages within the coating apparatus of the present invention. Initially, with the reactor 10 being arranged in a high temperature furnace, the nozzle 16 may be removed from the coating chamber 12 along with the bottom unloading plug 22 in order to permit servicing access to the nozzle. As described further below, it is particularly contemplated that carbonaceous deposits resulting from the coating of nuclear fuel particles will primarily build up on the nozzle 16 as illustrated and discussed in greater detail below in connection with FIG. 5. Thus, the bottom unloading plug may be lowered out of the coating chamber 12 in order to permit intermittent replacement or maintenance of the nozzle 16 without the need for further dismantling the coating apparatus.

The arrangement of the nozzle 16 upon the bottom unloading plug 22 also simplifies the manner in which reactant gas is supplied to the nozzle 16 and coated particles are removed from the chamber 12. For example, reactant gas may be supplied to the nozzle 16 through the interior of the bottom unloading plug 22. At the same time, an annular passage may be formed about the bottom unloading plug 22 and beneath the conical member 14 for receiving coated particles exiting the chamber 12 through the opening 32.

As for construction of the nozzle 16' itself, referring particularly to FIG. 3, its height may be selected in relation to the diameter or nominal lateral dimension of the coating chamber 12'. With the chamber base 14' being an inverted conical member as described above, the height of the nozzle 16', $h$, is preferably selected to be at least approximately $\frac{1}{4}$ of the diameter of the coating chamber 12' and the conical member 14', indicated as D. This relationship may be best seen in FIG. 3 but also applies to the nozzle arrangement of FIGS. 1 and 2.

Figure 4:
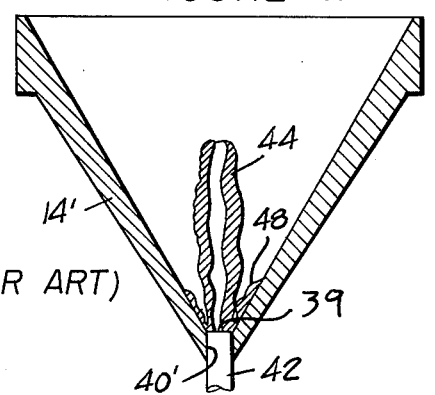
FIGS. 4 and 5 are views of nozzle arrangements according to the prior art and the present invention respectively while further illustrating undesirable carbonaceous deposition or buildup within the coating chamber.
Figure 5:
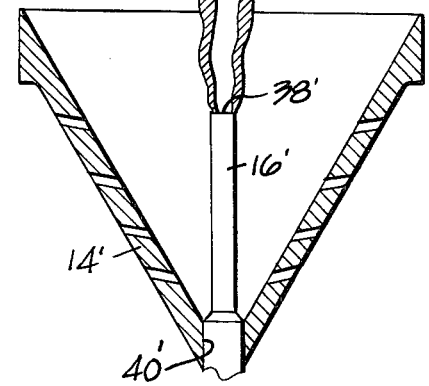

The importance of elevating the outlet 38 of the nozzle 16 substantially above the coating chamber base 14 is more clearly illustrated by the prior art representation of FIG. 4 compared with FIG. 5 which is representative of the present invention. In FIG. 5, a similar extended nozzle 16' also has a length or height as described above. FIG. 5 also illustrates that the extended nozzle need not be associated with the bottom unloading plug 22. In FIGS. 3 and 5, the nozzle 16' extends through a small opening indicated at 40 and 40' respectively at the apex of the inverted conical member 14'. In FIG. 4 by comparison, a flush nozzle 42 is arranged within the apex opening 40' of the inverted conical member 14' so that reactant gases are introduced into the coating chamber at the apex of the member 14'. During the coating operation, a carbonaceous deposit tends to form about the outlet 39 of the nozzle. For example, the carbonaceous buildup for the prior art flush nozzle 42 is indicated at 44 while a similar carbonaceous deposit for the nozzle 16' of the present invention is indicated in FIG. 5 at 46. Within the configuration of FIG. 4, as the carbonaceous material 44 is being formed, additional carbonaceous material is deposited upon the adjacent surfaces of the inverted conical base member 14'. This deposited material is indicated in FIG. 4 at 48. The carbonaceous deposit 48 upon the conical base is a particularly problem since it interferes with and prevents the flow of levitating gas through the porous or perforated plate of the member 14' into the coating chamber 12. This in turn tends to disrupt formation of the fluidized bed of particles and may result in improperly coated or even uncoated fuel particles because of the loss of fluidization at the apex of the base member 14' and the carbonaceous buildup 44. Thus, the extended nozzle is particularly important to proper operation of the coating apparatus as is also described in greater detail below.

By contrast, it may be seen from FIG. 5 that there is essentially no carbonaceous buildup on the surfaces of the conical base member 14' because of the elevated level for the nozzle outlet 38'. Also, the carbonaceous deposit 46 may be readily removed from the nozzle 16' to clear its outlet 38'. Since the nozzle itself is a relatively inexpensive component compared to the conical member 14 for example, the nozzle may be readily "sacrificed" in order to facilitate the periodic removal of the carbonaceous buildup from the coating chamber.

The height of the nozzle outlet 38 above the apex of the conical base member 14 is also important for another reason which is more clearly illustrated in FIG. 3.

Referring to FIG. 3, levitating gas entering the coating chamber 12 through the porous or preforated conical base member 14' is generally indicated at 50. As also described above, flow of the levitating gas into the coating chamber tends to suspend a bed of particles within the coating chamber into the relatively high density and low density phases indicated at 18 and 20. It has been found that use of the extended nozzle 16' permits the reactant gas from its outlet 38' to be introduced into the low density phase of the fluidized bed. Experimentation has indicated that the introduction of the reactant gas into the low density phase results in the formation of more spherical coated particles as is illustrated by FIGS. 6 and 7. It is theorized that the reactant gas has freer access to the particle surfaces within the low density phase. Accordingly, there is less restriction to growth of the coating material upon the particles and a more truly spherical configuration may be produced.

It has further been discovered in connection with the coating apparatus of FIG. 1 that coating within the low density phase 20 may be further enhanced by diluting the reactant gas delivered through the nozzle 16'. The reactant gas may be diluted for example by the same inert gas employed for levitation. Preferably, gas flow from the nozzle 16' may consist from approximately ten percent to approximately eighty percent by weight of inert gas and from approximately twenty percent to approximately ninety percent by weight of reactant gas.

FIGS. 6 and 7 are enlarged reproductions of coated nuclear fuel particles produced under similar conditions except for the following differences. The particles illustrated in FIG. 6 were produced in a coating chamber having an inverted base member such as that illustrated at 14' with an included angle of 60°. A flush nozzle of the type indicated at 42 in FIG. 4 was used in coating the particles represented in FIG. 6.

The particles represented in FIG. 7 were produced in a similar coating chamber under similar conditions also with a conical base member such as that indicated at 14' with an included angle of 60°. However, the particles in FIG. 7 were produced with an extended nozzle as illustrated at 16' in FIG. 5. In the actual coating apparatus employed to produce the particles of FIG. 7, the diameter of the coating chamber 12 and the outside diameter of the conical base member 14 were approximately 12.7 centimeters while the height of the nozzle 16' was approximately 7 centimeters. As a final point in connection with the carbonaceous buildups illustrated in FIGS. 4 and 5, it may be seen that a carbonaceous deposit such as that indicated at 48 upon the conical base 14' would also tend to interfere with unloading of coated particles from the coating chamber through the apex of the base member 14'. Accordingly, the extended nozzle configuration 16 or 16' provides an additional advantage in that such carbonaceous deposits are not present adjacent the annular passage 32 (see FIG. 2) to interfere with unloading operations.

In operation, a batch of particles to be coated is placed within the coating chamber and levitating gases are introduced to form a fluidized bed as described above in connection with FIG. 1. For the coating of nulcear fuel particles, the coating chamber 12 is arranged within a high temperature furnace. Further discussion of the high temperature furnace is not believed necessary sinces its operation is believed well known in the prior art. Reactant gas is then introduced into the low density particle phase 20 of the fluidized bed to result in the formation of more truly spherical coated particles at FIG. 7. Upon completion of the coating operation, the coated particles are removed from the coating chamber by means of a bottom unloading plug of the type illustrated at 22 in FIGS. 1 and 2. With the bottom unloading plug 22 being moved downwardly, the unloading opening 32 is formed for the removal of the coated particles from the chamber 12 thorugh the annular unloading passage 36. Since the particles flow out of the coating chamber 12 under the influence of gravity, they may be removed at high temperatures requiring little or no dwell time in the chamber 12 after completion of the coating operation for cooling. Thus, the coating apparatus 10 may be immediately refilled with a new batch of particles to commence a subsequent coating operation.

In the event of excessive carbon buildup on the nozzle 16, as described above and illustrated in FIG. 5 for the similar nozzle 16', the nozzle may be readily cleaned or replaced by lowering the nozzle support base 22 in order to facilitate continued operation of the coating apparatus.

Accordingly, a particularly effective method and apparatus for the gas coating of particles suspended in a fluidized bed have been described. Additional variations besides those referred to above are believed to be obvious within the scope of the present invention which is accordingly defined only by the following appended claims.

What is claimed is:

1. Apparatus for coating particles with a substance contained in a reactant gas, comprising
   means defining a generally cylindrical coating chamber for containing the particles to be coated,
   an inverted conical member having a downwardly extending apex forming a base for said coating chamber and including means for producing a flow of inert gas thereabove in order to form a fluidized bed of the particles above said conical member,
   a movable plug forming an apex portion of the inverted conical member, the unloading plug being movable to form an opening for unloading coated particles from said coating chamber, and
   an elongated nozzle mounted on said movable plug and extending upwardly from the apex of said conical member with its outlet being spaced substantially thereabove for introducing reactant gas into said coating chamber.

2. The coating apparatus of claim 1 wherein said inverted conical member is formed with an inside angle within the range of from approximately 30° to approximately 140°.

3. The apparatus of claim 2 wherein the included angle of said inverted conical member is preferably within a range of approximately 45° to approximately 90°.

4. The coating apparatus of claim 1 adapted for the high temperature gas coating of nuclear fuel particles, the means defining the cylindrical coating chamber forming a reaction chamber for a high temperature furnace.

5. The coating apparatus of claim 1 wherein said nozzle extends upwardly from the apex to a height of at least approximately one-quarter of the diameter of the coating chamber.

6. A high temperature, fluidized bed coating furnace for coating particles with a substance contained in a reactant gas and thereafter unloading the coated particles from the coating chamber, comprising means defining a generally cylindrical high temperature coating chamber for containing the particles to be coated, an inverted conical member having a downwardly and inwardly extending surface forming a base for said coating chamber and including means for producing a flow of inert gas thereabove to form a fluidized bed of the particles above said conical member, nozzle means for introducing the reactant gas into the coating chamber, said nozzle means being an elongated nozzle mounted upon said bottom unloading plug and extending upwardly from the apex of said conical member, and a bottom unloading plug arranged in a cylindrical opening at the apex of said conical member, said plug having an upper surface for closing the cylindrical opening during coating of the particles, said plug being vertically movable to form an annular opening for unloading coated particles from said coating chamber.

7. The high temperature, fluidized bed coating furnace of Claim 6 wherein said inverted conical member is formed with an included angle in a range of from approximately 30° to approximately 140°.

8. The high temperature, fluidized bed coating furnace of claim 6 wherein the elongated nozzle has a height of at least approximately ¼ of the diameter of said high temperature coating chamber.

9. The high temperature, fluidized bed coating funace of claim 6 wherein said elongated nozzle is replaceably mounted upon said bottom unloading plug and further comprising means forming an annular passage about the bottom unloading plug for receiving coated particles from the coating chamber.

* * * * *